(12) United States Patent
Okuma (10) Patent No.: US 9,084,714 B2
(45) Date of Patent: Jul. 21, 2015

(54) DEVICE FOR COUNTING THE NUMBER OF MEDICINES IN MEDICINE PACKAGING ENVELOPE

(75) Inventor: Keiji Okuma, Kumamoto (JP)

(73) Assignee: Ookuma Electronic Co., Ltd., Kumamoto-shi (JP)

( * ) Notice: Subject to any disclaimer, the term of this patent is extended or adjusted under 35 U.S.C. 154(b) by 768 days.

(21) Appl. No.: 13/173,153

(22) Filed: Jun. 30, 2011

(65) Prior Publication Data

US 2012/0002042 A1    Jan. 5, 2012

(30) Foreign Application Priority Data

Jul. 2, 2010  (JP) ................................. 2010-151571
Jul. 16, 2010 (JP) ................................. 2010-161240

(51) Int. Cl.

| | | |
|---|---|---|
| G01B 11/22 | (2006.01) | |
| G01B 11/24 | (2006.01) | |
| H04N 7/18 | (2006.01) | |
| G01C 15/00 | (2006.01) | |
| G06K 9/00 | (2006.01) | |
| A61J 7/02 | (2006.01) | |

(52) U.S. Cl.
CPC . *A61J 7/02* (2013.01); *G01B 11/22* (2013.01); *G01C 15/00* (2013.01); *H04N 7/18* (2013.01)

(58) Field of Classification Search
CPC ............. A61J 7/02; G01B 11/22; H04N 7/18; G01C 15/00
USPC ......................................................... 348/135

See application file for complete search history.

(56) References Cited

U.S. PATENT DOCUMENTS

| 2002/0005892 A1* | 1/2002 | Herre ............................... 348/86 |
| 2008/0174779 A1* | 7/2008 | Kaga et al. .................... 356/401 |
| 2009/0055116 A1* | 2/2009 | Chen et al. ....................... 702/82 |

FOREIGN PATENT DOCUMENTS

| JP | 7-200770 | 8/1995 |
| JP | 7-209196 | 8/1995 |
| JP | 2002-114357 | 4/2002 |
| JP | 2006-105852 | 4/2006 |
| JP | 2006334062 A * | 12/2006 |

* cited by examiner

*Primary Examiner* — Jessica M Prince
*Assistant Examiner* — On S Mung
(74) *Attorney, Agent, or Firm* — Jordan and Hamburg LLP (57) ABSTRACT

A device for counting the number of medicines in a medicine packaging envelope the device includes: an illumination part which is configured to irradiate near infrared rays toward a sheet surface of the medicine packaging envelope; an imaging part which is arranged at a position where the near infrared rays which pass through the medicine packaging envelope are received, and is configured to image the medicine packaging envelope; and a medicine counting unit which is configured to count the number of medicines based on a gray image from the imaging part, wherein the imaging part includes a visible light cut filter in a light receiving part thereof, and the visible light cut filter is configured to prevent a reflection light which is formed by the reflection of the visible light on the medicine packaging envelope from being incident on the imaging part.

1 Claim, 5 Drawing Sheets

DEVICE FOR COUNTING THE NUMBER OF MEDICINES IN MEDICINE PACKAGING ENVELOPE

FIELD OF THE INVENTION

The present invention relates to a device for counting the number of medicines in a medicine packaging envelope which automatically counts the number of medicines sealed in the medicine packaging envelope.

DESCRIPTION OF THE RELATED ART

Conventionally, in a dispensary of a hospital, a pharmacy or the like, one-pouch packaging (or one-dose packaging) is adopted. In this one-pouch packaging, medicines consisting of plural kinds of tablets and the like to be dosed by a patient at a time are offered in a state where the medicines are sealed in one medicine packaging envelope using a known automatic dispensing device, for example. Here, to count the number of medicines sealed in the medicine packaging envelope and to exclude the medicine packaging envelope where the number of sealed medicines is found abnormal are extremely important from a viewpoint of offering medicines which conform to the prescription to a patient.

Accordingly, for example, there has been proposed a medicine inspection device which automatically counts the number of medicines in a medicine packaging envelope by imaging the medicine packaging envelope by a CCD camera and by executing image processing of an imaged image of the medicine packaging envelope.

However, for example, characters such as a patient's name or a date or various graphic patterns are indicated on the medicine packaging envelope in many cases and hence, there has been known a drawback that images of these characters, graphic patterns or the like impede the counting of the number of medicines.

In view of such circumstances, there have been made various proposals (for example, JP-A-7-200770 (patent document 1)) for overcoming such a drawback.

SUMMARY OF THE INVENTION

Patent document 1 discloses a tablet inspection system for detecting the number of tablets sealed in a light-transmitting medicine packaging envelope. The tablet inspection system includes an illumination unit which is arranged to illuminate the medicine packaging envelope from a back surface, an imaging unit which images the medicine packaging envelope at an inspection position, and an image recognition processing unit which counts the number of tablets in the medicine packaging envelope by processing an image obtained by the imaging unit. The image recognition processing unit includes a unit which binarizes a gray image from the imaging unit, and a unit which executes noise removal processing constituted of contraction and expansion on the binarized image, and the tablet inspection system eliminates characters of a print portion on a surface of the medicine packaging envelope and other noises from the image.

However, according to patent document 1, in eliminating the characters or the like of the print portion on the surface of the medicine packaging envelope by executing the above-mentioned noise eliminating processing, for example, when an image of a tablet has the approximately same size as the characters, there exists a drawback that the image of the tablet is also eliminated.

Further, according to patent document 1, in the tablet inspection system, noise eliminating processing is executed such that contraction and expansion are performed twice respectively and hence, for example, a character image of a relatively small size can be eliminated. However, there exists a drawback that the elimination of a character image of a large size is difficult.

The present invention has been made to overcome the above-mentioned drawbacks, and it is an object of the present invention to provide a device for counting the number of medicines in a medicine packaging envelope which can surely count the number of medicines in the medicine packaging envelope irrespective of a size of an information identification portion constituted of a character, a graphic pattern or the like indicated on the medicine packaging envelope.

According to one aspect of the present invention, there is provided a device for counting the number of medicines in a medicine packaging envelope which counts the number of medicines sealed in a pouch portion of the medicine packaging envelope, wherein the pouch portion is formed by sealing peripheries of sheets which allow the transmission of near infrared rays therethrough in an overlapping manner, and the sheet includes an information identification portion which allows the transmission of near infrared rays therethrough, the device for counting the number of medicines including: an illumination part which is configured to irradiate the near infrared rays toward a sheet surface of the medicine packaging envelope; an imaging part which is arranged at a position where the near infrared rays which pass through the medicine packaging envelope are received, and is configured to image the medicine packaging envelope; and a medicine counting unit which is configured to count the number of medicines based on a gray image from the imaging part, wherein the imaging part includes a visible light cut filter in a light receiving part thereof, and the visible light cut filter is configured to prevent a reflection light which is formed by the reflection of the visible light on the medicine packaging envelope from being incident on the imaging part.

According to another aspect of the present invention, there is provided a device for counting the number of medicines in a medicine packaging envelope which counts the number of medicines sealed in a pouch portion of the medicine packaging envelope, wherein the pouch portion is formed by sealing peripheries of sheets which allow the transmission of near infrared rays therethrough in an overlapping manner, and one of the overlapped sheets includes an information identification portion, the device for counting the number of medicines including: an illumination part which is configured to irradiate the near infrared rays toward the medicine packaging envelope from below the medicine packaging envelope arranged at a predetermined height in a state where one sheet faces downward; first and second imaging parts which are arranged at a position where the near infrared rays which pass through the medicine packaging envelope are received and are configured to image the medicine packaging envelope from different imaging positions; a distance acquisition unit which is configured to acquire distances from the respective imaging positions to the medicine packaging envelope by making use of parallax when viewed from the respective imaging positions, based on gray images from the first and second imaging parts; an image elimination unit which is configured to eliminate an image of the information identification portion based on the distances; and a medicine counting unit which is configured to count the number of medicines based on the gray images after eliminating the image, wherein the first and second imaging parts include a visible light cut filter in respective light receiving parts thereof, and the visible light cut filters are configured to prevent a reflection light which is formed by the reflection of the visible light on the medicine packaging envelope from being incident on the first and second imaging parts.

According to the present invention, in the device for counting the number of medicines in a medicine packaging envelope which counts the number of medicines sealed in a pouch portion of the medicine packaging envelope, wherein the pouch portion is formed by sealing peripheries of sheets which allow the transmission of near infrared rays therethrough in an overlapping manner, and the sheet includes an information identification portion which allows the transmission of near infrared rays therethrough, the device for counting the number of medicines includes an illumination part which is configured to irradiate the near infrared rays toward a sheet surface of the medicine packaging envelope; an imaging part which is arranged at a position where the near infrared rays which pass through the medicine packaging envelope are received, and is configured to image the medicine packaging envelope; and a medicine counting unit which is configured to count the number of medicines based on a gray image from the imaging part, wherein the imaging part includes a visible light cut filter in a light receiving part thereof, and the visible light cut filter is configured to prevent a reflection light which is formed by the reflection of the visible light on the medicine packaging envelope from being incident on the imaging part.

Due to such a constitution, even when a light which advances toward the imaging part contains a reflection light component which is formed by the reflection of a visible light on the medicine packaging envelope, the influence of the reflection light component exerted on the image of the information identification portion can be reduced by attenuating the reflection light component by the filter portion. Accordingly, only a silhouette image of the medicines formed by near infrared rays can be acquired and hence, it is possible to provide a device for counting the number of medicines in a medicine packaging envelope which can surely count the number of medicines in the medicine packaging envelope irrespective of a size of an information identification portion constituted of a character, a graphic pattern or the like indicated on the medicine packaging envelope.

Also according to the present invention, in the device for counting the number of medicines in a medicine packaging envelope which counts the number of medicines sealed in a pouch portion of the medicine packaging envelope, wherein the pouch portion is formed by sealing peripheries of sheets which allow the transmission of near infrared rays therethrough in an overlapping manner, and one of the overlapped sheets includes an information identification portion, the device for counting the number of medicines includes: an illumination part which is configured to irradiate the near infrared rays toward the medicine packaging envelope from below the medicine packaging envelope arranged at a predetermined height in a state where one sheet faces downward; first and second imaging parts which are arranged at a position where the near infrared rays which pass through the medicine packaging envelope are received and are configured to image the medicine packaging envelope from different imaging positions; a distance acquisition unit which is configured to acquire distances from the respective imaging positions to the medicine packaging envelope by making use of parallax when viewed from the respective imaging positions, based on gray images from the first and second imaging parts; an image elimination unit which is configured to eliminate an image of the information identification portion based on the distances; and a medicine counting unit which is configured to count the number of medicines based on the gray images after eliminating the image, wherein the first and second imaging parts include a visible light cut filter in respective light receiving parts thereof, and the visible light cut filters are configured to prevent a reflection light which is formed by the reflection of the visible light on the medicine packaging envelope from being incident on the first and second imaging parts.

Due to such a constitution, even when a light which advances toward the imaging part contains a reflection light component which is formed by the reflection of a visible light on the medicine packaging envelope, the influence of the reflection light component exerted on the image of the information identification portion can be reduced by attenuating the reflection light component by the filter portion, and even when the information identification portion does not allow the transmission of near infrared rays therethrough or the transmissivity of the near infrared rays at the information identification portion is low, an image of the information identification portion at a position below the medicines in height can be eliminated by the image elimination unit. Accordingly, only a silhouette image of the medicines formed by near infrared rays can be acquired and hence, it is possible to provide a device for counting the number of medicines in a medicine packaging envelope which can surely count the number of medicines in the medicine packaging envelope irrespective of a size of an information identification portion constituted of a character, a graphic pattern or the like indicated on the medicine packaging envelope.

DESCRIPTION OF THE PREFERRED EMBODIMENTS

Hereinafter, a device for counting the number of medicines in a medicine packaging envelope according to an embodiment of the present invention is explained in conjunction with drawings.

In the explanation made hereinafter, the medicine means tablets which are formed by compressing effective ingredients or the like, capsules which are formed by filling powdery medicines therein and the like.

Also in the explanation made hereinafter, near infrared rays means a light having a wavelength of approximately 0.7 μm to 2.5 μm.

Further, in the explanation made hereinafter, an information identification portion means a character, a graphic pattern or the like indicated on a medicine packaging envelope by printing or writing (see FIG. 2).

Figure 1:
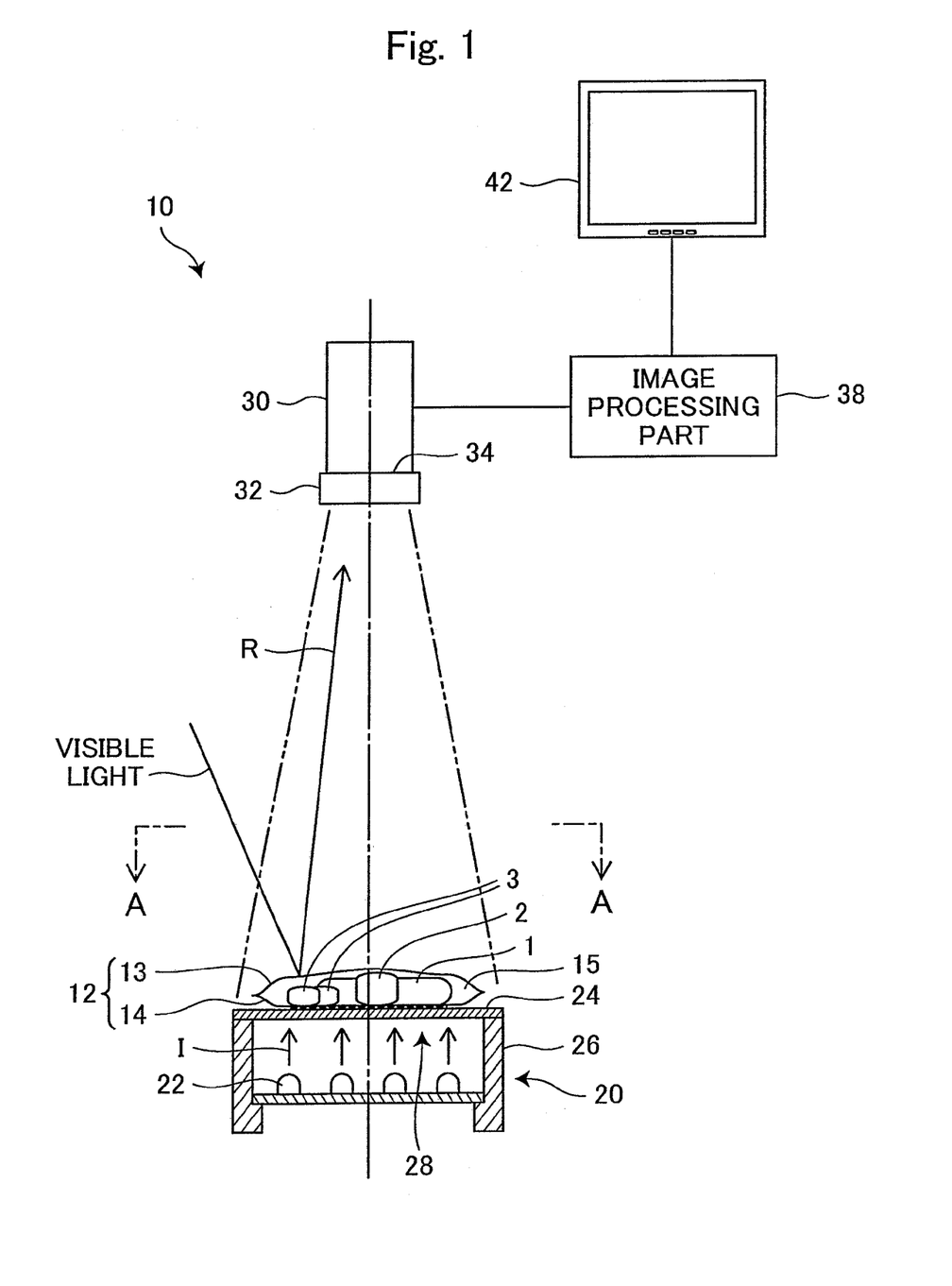
FIG. 1 is an explanatory view with a part in cross section of a device for counting the number of medicines in a medicine packaging envelope according to a first embodiment of the present invention.
Figure 2:
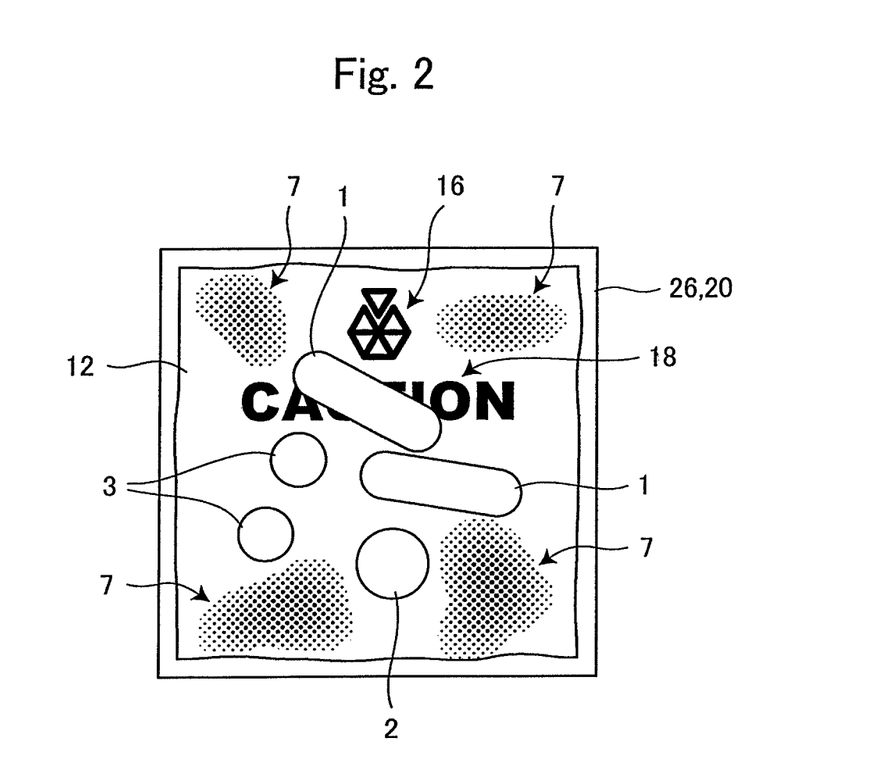
FIG. 2 is a view as viewed in the direction of an arrow A-A.
Figure 3A:
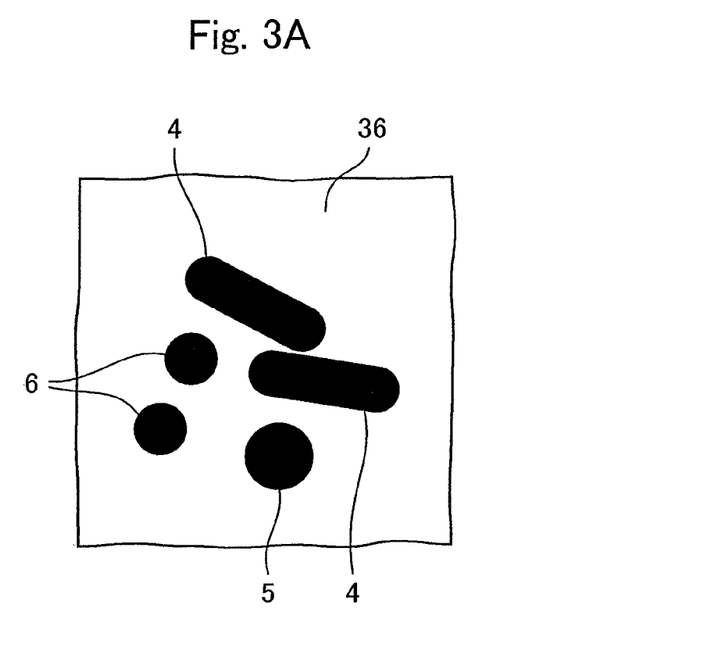
FIG. 3A is a view for explaining an image example acquired by the device for counting the number of medicines in a medicine packaging envelope according to the first embodiment of the present invention and FIG. 3B is a view for explaining a comparison image example.
Figure 3B:
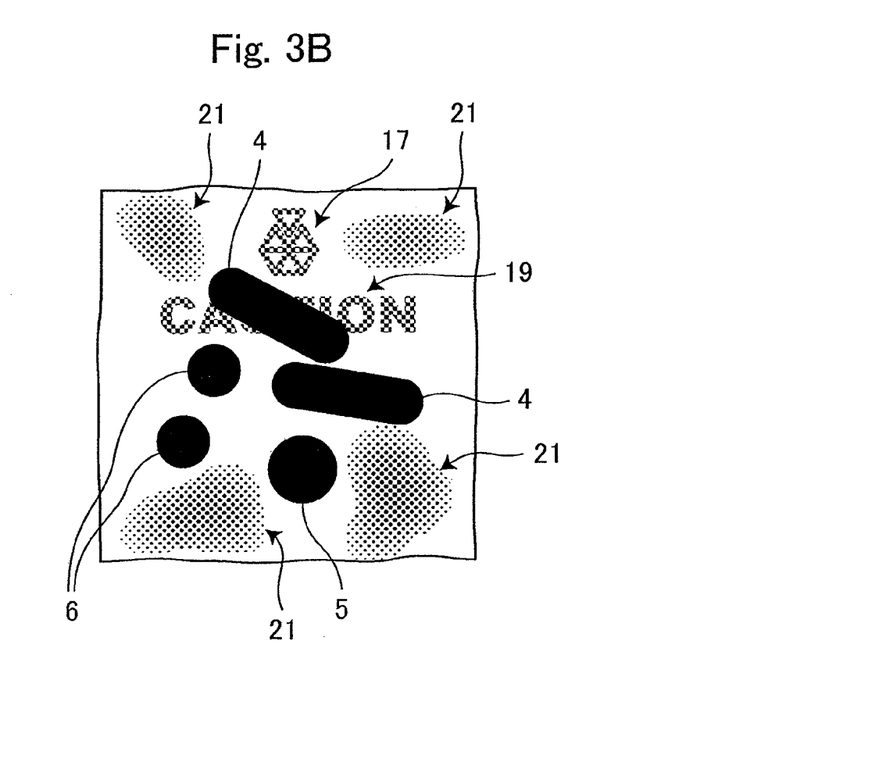

Firstly, the device 10 for counting the number of medicines in a medicine packaging envelope according to a first embodiment of the present invention is explained in conjunction with FIG. 1 to FIG. 3. FIG. 1 is an explanatory view with a part in cross section of the device 10 for counting the number of medicines in a medicine packaging envelope according to this embodiment, and FIG. 2 is a view as viewed in the direction of an arrow A-A. FIG. 3A is a view for explaining an image example acquired by the device 10 for counting the number of medicines in a medicine packaging envelope according to this embodiment and FIG. 3B is a comparison image example.

Before explaining the device 10 for counting the number of medicines in a medicine packaging envelope according to this embodiment, the medicine packaging envelope 12 and an information identification portion of this embodiment are explained.

The medicine packaging envelope 12 of this embodiment is a known pouch in which medicines are filled at hospitals in general and dispensing pharmacies, and includes a pouch portion 15 in which the above-mentioned medicines are filled. The pouch portion 15 is formed by sealing peripheries of an upper sheet 13 and a lower sheet 14 in an overlapping state. To be more specific, as shown in FIG. 1 and FIG. 2, for example, the upper sheet 13 and the lower sheet 14 having an approximately square shape are overlapped to each other, and the peripheries of the sheets 13, 14 are sealed to each other by compression bonding or welding thus forming the pouch portion 15. The upper sheet 13 and the lower sheet 14 are formed of a transparent or semitransparent sheet made of a synthetic resin material which allows the transmission of near infrared rays therethrough such as polyethylene, polypropylene or polyethylene terephthalate.

Further, the information identification portion described later is formed on the lower sheet 14 which constitutes one of the upper and lower sheets 13, 14 which are overlapped to each other.

In the inside of the pouch portion 15 of the medicine packaging envelope 12 formed in this manner, as shown in FIG. 1 and FIG. 2, for example, capsules 1, tablets 2 and tablets 3 slightly smaller than the tablets 2 are filled as medicines.

In FIG. 2, numeral 7 indicates a high brightness region where a visible light impinges on a surface of the medicine packaging envelope 12 and generates irregular reflection thus making the region particularly bright (high brightness) on the whole surface of the medicine packaging envelope 12.

A shape of the medicine packaging envelope 12 is not limited to the approximately square shape in this embodiment and may be a rectangular shape. Further, for example, the medicine packaging envelope 12 may be formed by folding a rectangular sheet in an overlapping manner at the approximately center portion of a long side of the rectangular sheet and by sealing three sides except for a bent side of the rectangular sheet.

Next, as shown in FIG. 2, the information identification portions of this embodiment are constituted of, for example, a graphic pattern 16 and an alphabet character 18. These information identification portions (16, 18) are formed on the lower sheet 14 by printing known ink composition having near infrared ray transmitting property. The inventor of the present invention have extensively studied various kinds of sheets used for forming generally commercially available medicine packaging envelopes, and have found that most of the character or the graphic pattern printed on the sheets allows near infrared rays to pass therethrough, and printings or the like formed by a printer used in an automatic dispensing device available in hospitals or the like also allow near infrared rays to pass therethrough in many cases.

The information identification portion may take various colors such as blue, green and red, and the color of the information identification portion may be black. However, it is preferable that the transmissivity of near infrared rays is not less than 10%. The reason of setting the transmissivity of near infrared rays to not less than 10% is explained later.

Further, in this embodiment, the formation of the information identification portions (16, 18) are not limited to the lower sheet 14, and it is sufficient that the information identification portions (16, 18) are formed on either one of the upper sheet 13 and the lower sheet 14.

Here, the device 10 for counting the number of medicines in a medicine packaging envelope according to this embodiment is explained. The device 10 for counting the number of medicines in a medicine packaging envelope according to this embodiment includes, as shown in FIG. 1, an illumination part 20, an imaging part 30, an image processing part 38, and a monitor 42. In FIG. 1, the illumination part 20 is expressed as a cross-sectional view.

The illumination part 20 of this embodiment is formed of, as shown in FIG. 1, a direct backlight which includes a plurality of light sources 22, a frame 26 and a diffusion plate 24.

The frame 26 is formed of, as shown in FIG. 1 and FIG. 2, a rectangular parallelepiped box body with an opened ceiling portion 28.

The light source 22 is formed of an LED lamp which emits near infrared rays having a peak at 850 μm, for example. As shown in FIG. 1, the light sources 22 are housed in a bottom portion side of the frame 26, and irradiate near infrared rays toward the ceiling portion 28. The light source 22 is not limited to the LED lamp and may be a semiconductor laser, for example. The reason why near infrared rays is adopted as a light which the light source 22 emits is that the near infrared rays possesses high transmissivity in general and hence, the near infrared rays provides the easier observation of a transmitted image compared to a visible light, for example.

The diffusion plate 24 is formed of an approximately flat thin sheet which allows the transmission and the diffusion of a light from the light sources 22 therethrough, and is mounted on the ceiling portion 28 like a lid which covers the ceiling portion 28. Although a material of the diffusion plate 24 is not necessarily limited, a material having an excellent transmitted-light diffusion function is preferable. To be more specific, it is preferable to use a whitish (milky-white) polycarbonate resin, acrylic resin, polypropylene resin or the like as the material of the diffusion plate 24.

Then, the illumination part 20 irradiates near infrared rays toward a surface of a sheet. To be more specific, as shown in FIG. 1, the diffusion plate 24 is arranged in an approximately horizontal posture and the medicine packaging envelope 12 is placed on the diffusion plate 24 and hence, the illumination part 20 is arranged approximately vertically below the medicine packaging envelope 12 whereby the illumination part 20 irradiates the near infrared rays I toward the surface of the sheet (14).

Different from this embodiment where the medicine packaging envelope 12 is directly placed on the diffusion plate 24, for example, it may be possible to adopt the constitution where the medicine packaging envelope 12 is horizontally conveyed by placing the medicine packaging envelope 12 on a belt conveyor formed using a material which allows near infrared rays to pass therethrough, and the illumination part 20 is arranged at a predetermined position below the belt conveyor.

Next, the imaging part 30 of this embodiment is formed of, for example, a digital camera provided with a light receiving element such as a CCD image sensor or a CMOS image sensor (not shown in the drawing). It is preferable to use the light receiving element which exhibits high sensitivity to near infrared rays. The imaging part 30 may be a stereoscopic image part.

As shown in FIG. 1, a visible light cut filter 32 is mounted on a light receiving part 34 which is provided to a distal end of the imaging part 30. The visible light cut filter 32 of this embodiment is formed of an optical filter which attenuates light in a visible light range (for example, 360 μm to 750 μm) while not attenuating near infrared rays, and prevents the incidence of a visible light to the light receiving element.

The imaging part 30 is arranged at a position where near infrared rays I which pass through the medicine packaging envelope 12 are received, and images the medicine packaging envelope 12. To be more specific, as shown in FIG. 1, the imaging part 30 is arranged at a position above the illumination part 20 in an opposed manner, and images the medicine packaging envelope 12 by receiving the near infrared rays I which pass through the medicine packaging envelope 12.

The position of the imaging part 30 is not limited to the position above the illumination part 20 and, provided that the imaging part 30 is positioned where the imaging part 30 can receive near infrared rays passing through the medicine packaging envelope, the imaging part 30 can be arranged at an arbitrary position corresponding to the direction of the illumination part 20 and the posture of the medicine packaging envelope 12. An image imaged by the imaging part 30 is described later.

Next, the image processing part 38 includes a CPU (not shown in the drawing), an image memory (not shown in the drawing) and the like, and functions as medicine counting unit.

To be more specific, the image processing part 38 acquires a gray image which is an original image from the imaging part 30. Then, the image processing part 38 counts the number of medicines by executing image processing such as binarization processing which eliminates an image of the information identification portion from the gray image, known labeling processing or the like based on a predetermined threshold value, for example. That is, the image processing part 38 functions as the medicine counting unit which counts the number of medicines 1, 2, 3 based on the gray image from the imaging part 30.

Further, the image processing part 38 displays steps of the above-mentioned image processing on the monitor 42.

Next, an operational example of the device 10 for counting the number of medicines in a medicine packaging envelope according to this embodiment is explained.

Firstly, as shown in FIG. 1, the medicine packaging envelope 12 in which the capsules 1 and the tablets 2, 3 are filled is placed on the illumination part 20, to be more specific, on the diffusion plate 24 in a state where the lower sheet 14 faces downward.

Next, the near infrared rays I are irradiated to the medicine packaging envelope 12 from the illumination part 20, and the near infrared rays I which pass through the medicine packaging envelope 12 are received by the imaging part 30 so that the medicine packaging envelope 12 is imaged.

An image which the imaging part 30 acquires is explained in conjunction with FIG. 3A and FIG. 3B. FIG. 3A shows an image example acquired by the device 10 for counting the number of medicines in a medicine packaging envelope according to this embodiment, and FIG. 3B shows a comparison image example acquired when the visible light cut filter 32 is not mounted on such a device 10.

Although the near infrared rays I pass through the sheets (13, 14), the near infrared rays I do not pass through the medicines 1, 2, 3 having large thicknesses. Accordingly, the image which the imaging part 30 acquires becomes, as shown in FIG. 3A and FIG. 3B, a gray image where the brightness of an image 36 corresponding to portions of the medicine packaging envelope 12 other than the medicine portions which allow near infrared rays to pass therethrough becomes higher than the brightnesses of images 4, 5, 6 corresponding to the medicine portions of the medicine packaging envelope 12. In FIG. 3A and FIG. 3B, numeral 4 indicates the image of the capsule 1, numeral 5 indicates the image of the tablet 2, and numeral 6 indicates the image of the tablet 3.

To consider a case where the medicine packaging envelope 12 is imaged under a visible light environment such as an ordinary dispensing pharmacy, as shown in FIG. 1, a reflection light R which is formed by the reflection of a visible light on the medicine packaging envelope 12 is incident on the imaging part 30. Accordingly, when the imaging part 30 is not provided with the visible light cut filter 32, a gray image acquired by the imaging part 30 also includes, as shown in FIG. 3B, in addition to a gray image which is a transmission image formed of near infrared rays, a graphic pattern image 17, a character image 19 and an image 21 corresponding to the above-mentioned high brightness region 7 (see FIG. 2) which are formed by the reflection light R. In FIG. 3B, numeral 17 indicates the image of the graphic pattern 16 formed by the reflection light R, and numeral 19 indicates the image of the alphabet character 18 formed by the reflection light R. Accordingly, when the images 17, 19 of the information identification portions overlap with the image 4 of the medicine, for example, the image processing part 38 erroneously recognizes the image 4 of the medicine thus giving rise to a drawback that the accuracy in counting the number of medicines is lowered or a drawback on image processing that setting of a threshold value for binarization becomes difficult due to the influence exerted by the above-mentioned image 21.

To the contrary, according to the device 10 for counting the number of medicines in a medicine packaging envelope of this embodiment, the imaging part 30 is provided with the visible light cut filter 32 and hence, a gray image acquired by the imaging part 30 is formed of only a transmission image (a silhouette image of the medicine packaging envelope) formed by near infrared rays. That is, the gray image acquired by the imaging part 30 becomes, as shown in FIG. 3A, a gray image which does not contain the images 17, 19 of the information identification portion and the image 21 corresponding to the high brightness region 7 which are formed by the above-mentioned reflection light R.

Next, the image processing part 38 which constitutes the medicine counting unit acquires the gray image from the imaging part 30, acquires only a silhouette image of the medicines formed by the near infrared rays through the above-mentioned binarization processing based on this gray image (see FIG. 3A), and executes image processing such as labeling processing based on the silhouette image thus counting the number of medicines.

In this manner, according to the device 10 for counting the number of medicines in a medicine packaging envelope of this embodiment, the influence exerted by the information identification portion indicated on the medicine packaging envelope 12 can be surely eliminated thus realizing counting of the number of medicines in the medicine packaging envelope with high accuracy.

Next, the reason why the transmissivity of near infrared rays at the information identification portion is preferably set to 10% or more is described hereinafter.

The smaller the transmissivity of near infrared rays at the information identification portion which is below 10% becomes in a state where the transmissivity of near infrared rays at the sheets (13, 14) which form the medicine packaging envelope is set to approximately 100%, the brightness of the image of the information identification portion and the brightness of the image of the medicine become closer to each other in the gray image acquired by the imaging part 30. In this case, as shown in FIG. 3A, it becomes difficult to find a predetermined threshold value for binarization between the images (4, 5, 6) of the medicines and the image 36 of the medicine-packaging-envelope portion, that is, a threshold value for eliminating the image of the information identification portion from the original image.

Figure 4:
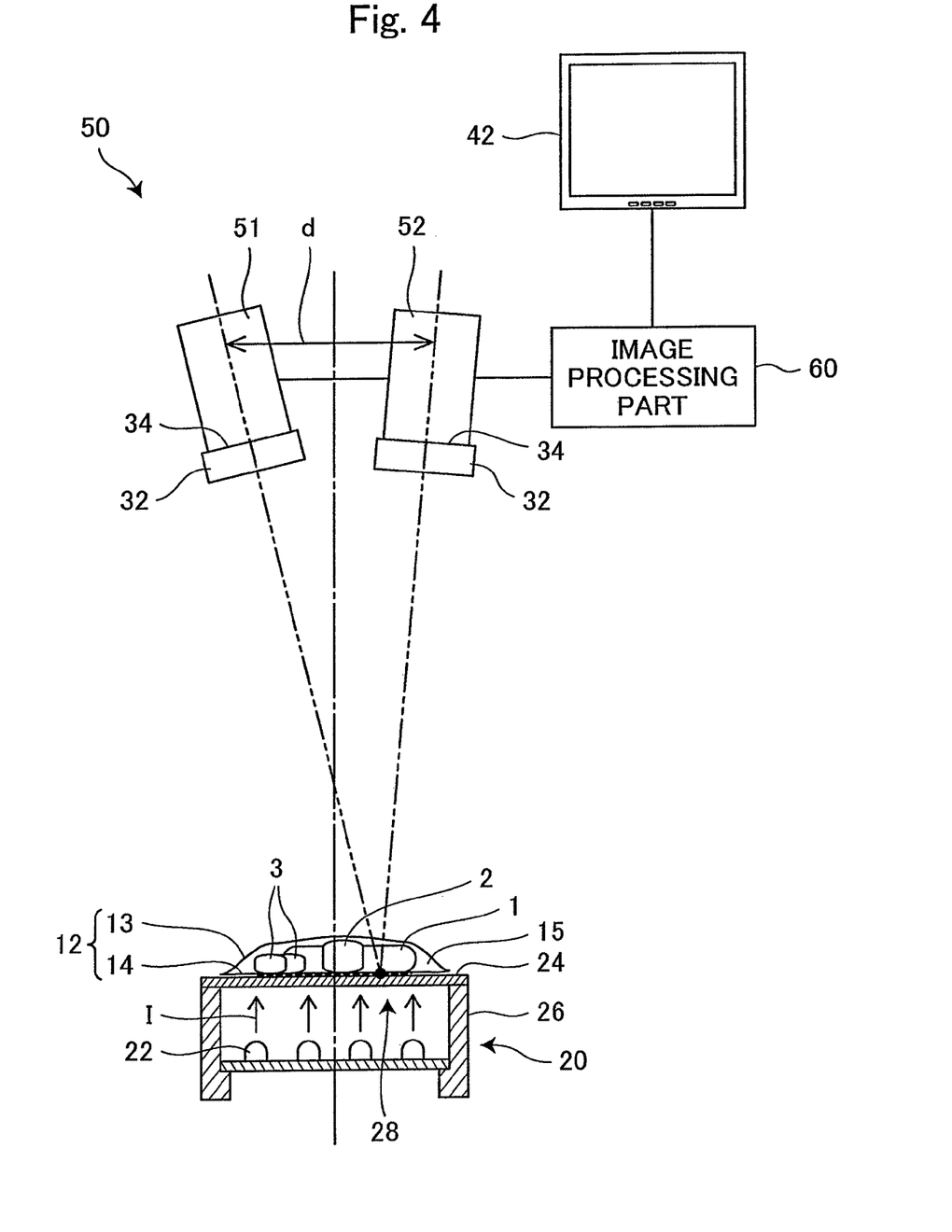
FIG. 4 is an explanatory view with a part in cross section of a device for counting the number of medicines in a medicine packaging envelope according to a second embodiment of the present invention.
Figure 5:
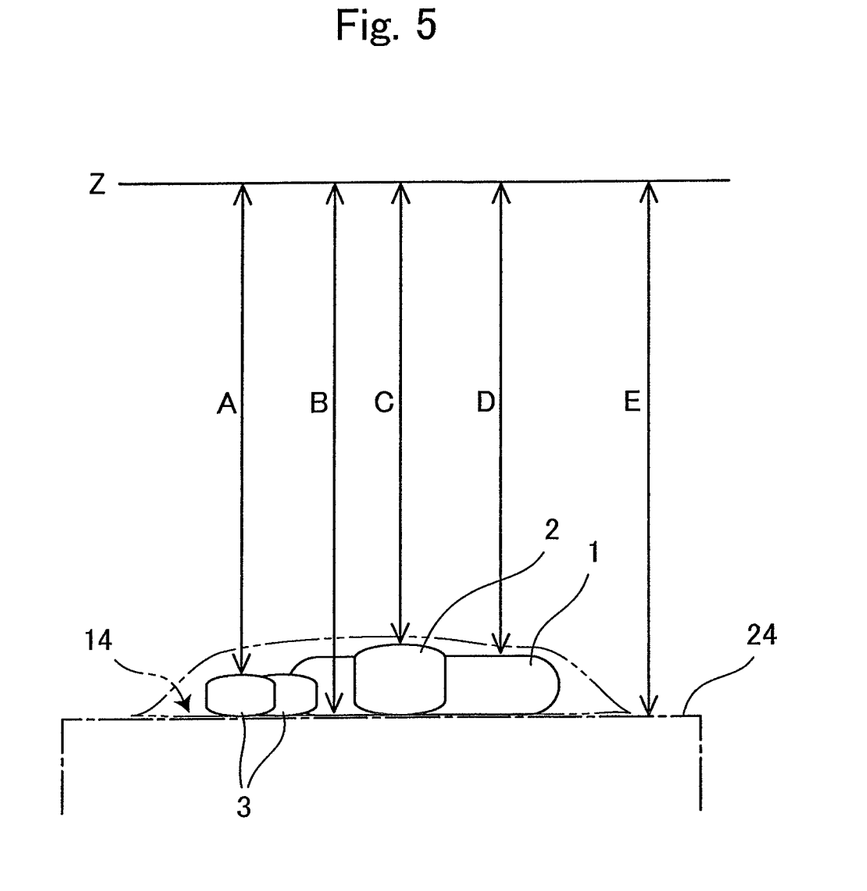
FIG. 5 is a view for explaining a concept of an image elimination unit according to the second embodiment of the present invention.

Next, a device 50 for counting the number of medicines in a medicine packaging envelope according to a second embodiment of the present invention is explained in conjunction with FIG. 4 and FIG. 5. FIG. 4 is an explanatory view with a part in cross section of the device 50 for counting the number of medicines in a medicine packaging envelope according to this embodiment. FIG. 5 is a view for explaining a concept of an image elimination unit of this embodiment.

A main point which makes this embodiment different from the first embodiment lies in that a medicine packaging envelope 12 is imaged at plural different imaging positions, and an image of an information identification portion is eliminated by making use of the difference in height between medicines and the information identification portion. In FIG. 4 and FIG. 5, parts identical with the corresponding parts in the first embodiment are given the same symbols and the repeated explanation of these parts is omitted. Also in this embodiment, the information identification portion such as a character or a graphic pattern is included only in a lower sheet of the medicine packaging envelope 12.

The device 50 for counting the number of medicines in a medicine packaging envelope according to this embodiment includes, as shown in FIG. 4, an illumination part 20, first and second imaging parts 51, 52, an image processing part 60 and a monitor 42.

The illumination part 20 of this embodiment is, as shown in FIG. 4, arranged at a predetermined height position in a state where a diffusion plate 24 faces upward. The medicine packaging envelope 12 is placed on the diffusion plate 24 in a state where the lower sheet 14 faces the diffusion plate 24. That is, the illumination part 20 is configured to irradiate near infrared rays in the approximately vertical direction with respect to a surface of the lower sheet 14 from below the medicine packaging envelope 12 which is arranged at the predetermined height in a state where the lower sheet 14 which constitutes one of sheets of the medicine packaging envelope 12 faces downward.

Different from this embodiment where the medicine packaging envelope 12 is directly placed on the diffusion plate 24, for example, it may be possible to adopt the constitution where the medicine packaging envelope 12 is horizontally conveyed at the predetermined height by placing the medicine packaging envelope 12 on an approximately flat belt conveyor formed using a material which allows near infrared rays to pass therethrough, and the illumination part 20 is arranged at a predetermined position below the belt conveyor.

Next, the first and second imaging parts 51, 52 are respectively constituted of the same digital camera used as the imaging part 30 of the first embodiment.

To be more specific, the first and second imaging parts 51, 52 of this embodiment are respectively constituted of digital cameras having the same focal length. As shown in FIG. 4, the first and second imaging parts 51, 52 are arranged in a spaced-apart manner from each other in the horizontal direction by a predetermined distance d at a predetermined height above the illumination part 20, and image the medicine packaging envelope 12 by receiving near infrared rays I. That is, the first and second imaging parts 51, 52 are arranged at the positions where the imaging parts 51, 52 receive the near infrared rays I which pass through the medicine packaging envelope, and image the medicine packaging envelope 12 at different imaging positions.

The first and second imaging parts 51, 52 include respectively, as shown in FIG. 4, a visible light cut filter 32 at respective light receiving parts 34 thereof.

Next, the image processing part 60 includes, in the same manner as the image processing part 38 of the first embodiment, a CPU (not shown in the drawing), an image memory (not shown in the drawing) and the like, and acquires a gray image or the like from the first and second imaging parts 51, 52.

The image processing part 60 functions as a distance acquisition unit, and executes processing for acquiring a distance to an object to be imaged by executing so-called stereoscopic image processing. To be more specific, based on a parallax generated when the medicine packaging envelope (to be more specific, medicine or information identification portion) is observed from respective imaging positions of the first and second imaging parts 51, 52, for example, the distance from a focal point of the first imaging part 51 to the medicine packaging envelope (to be more specific, medicine or information identification portion) is acquired based on the principle of triangulation using camera parameters such as mounting positions and focal lengths of the first and second imaging parts 51, 52.

Next, based on the acquired distance, as shown in FIG. 5, the image processing part 60 sets the height of the focal point of the first imaging part 51 as the reference height Z, and acquires vertical distances A, B, C, D to the object to be imaged (medicine or information identification portion) from the reference height Z. In FIG. 5, symbol A indicates the vertical distance from the reference height Z to an approximately upper end portion of a tablet 3, symbol B indicates the vertical distance from the reference height Z to the information identification portion (character, graphic pattern), symbol C indicates the vertical distance from the reference height Z to an approximately upper end portion of a tablet 2, and symbol D indicates the vertical distance from the reference height Z to an approximately upper end portion of a capsule 1.

In this case, the medicines and the information identification portion may be restored in a three-dimensional virtual space using a known three dimensional restoring technique, and a distance from a focal point of the first imaging part 51 to the object to be imaged (medicine or information identification portion) in the three-dimensional virtual space may be acquired.

For example, a calibration jig on which a graphic pattern which becomes the reference is indicated is arranged at a predetermined position, and reference images which are acquired by imaging the calibration jig by the first and second imaging parts 51, 52 respectively and the above-mentioned camera parameters and the like are stored in the image memory in advance. Next, the medicines and information identification portion are restored in the three-dimensional virtual space based on the images of the medicines and the image of the information identification portion acquired by imaging the medicine packaging envelope 12, the reference images, camera parameters and the like.

Then, as shown in FIG. 5, the distance acquisition unit (image processing part 60) sets the height of the focal point (imaging portion) of the first imaging part 51 as the reference height Z, for example, and acquires a vertical distance from the reference height Z to the object to be imaged (medicine or information identification portion).

Further, the image processing part 60 functions as an image elimination unit, and executes processing for eliminating an image of the information identification portion from a gray image of the medicine packaging envelope including the medicines and the information identification portion based on the vertical distances acquired in the above-mentioned manner.

To be more specific, the lower sheet 14 of the medicine packaging envelope 12 is, as shown in FIG. 4 and FIG. 5, arranged at a predetermined height substantially equal to a height of the diffusion plate 24. Accordingly, the vertical distance B from the reference height Z to the information identification portion which constitutes an object to be imaged becomes substantially equal to the vertical distance E from the reference height Z to the diffusion plate 24. Accordingly, the image elimination unit determines whether or not the vertical distance to the object to be imaged acquired by the distance acquisition unit falls within a predetermined range where the vertical distance E assumes the center. When the image elimination unit determines that the vertical distance falls within the predetermined range, the image elimination unit executes processing for eliminating the image of the object to be imaged from the gray image thus eliminating the image of the information identification portion from the gray image.

Further, the image processing part 60 executes image processing such as the above-mentioned binarization processing or known labeling processing based on the gray image from which the image of the information identification portion is eliminated by the image elimination unit thus functioning as a medicine counting unit which counts the number of medicines.

In this manner, according to the device 50 for counting the number of medicines in a medicine packaging envelope of this embodiment, since the transmissivity of near infrared rays in the information identification portion is smaller than 10%, for example, even when the information identification portion (character or graphic pattern) hardly allows near infrared rays to pass therethrough, an image of the information identification portion can be surely eliminated.

In such an operation, as shown in FIG. 4, it is desirable to place the medicine packaging envelope 12 in a mode where the whole lower sheet is brought into contact with a surface of the diffusion plate 24. By placing the medicine packaging envelope 12 in such a mode, the information identification portion can be arranged below upper end portions of the medicines 1, 2, 3.

In this embodiment, the explanation has been made with respect to the case where the height of the focal point of the first imaging part 51 is set as the reference height Z. However, the reference height Z is not limited to such a height, and the height of an upper surface of the diffusion plate 24 may be set as the reference height Z, for example.

As has been explained heretofore, according to the devices 10, 50 for counting the number of medicines in a medicine packaging envelope of the embodiments, it is possible to provide the device for counting the number of medicines in a medicine packaging envelope which can surely count the number of medicines in a medicine packaging envelope irrespective of a size of the information identification portion formed of a character, graphic pattern or the like indicated on the medicine packaging envelope 12.

Although several embodiments of the present invention have been explained in detail in conjunction with drawings, these are provided as merely examples, and the present invention can be carried out in other modes with various modifications and variations based on knowledge of those who are skilled in the art.

What is claimed is:

1. A device for counting the number of medicines in a medicine packaging envelope which counts the number of medicines sealed in a pouch portion of the medicine packaging envelope, wherein the pouch portion is formed by sealing peripheries of sheets which allow the transmission of near infrared rays therethrough in an overlapping manner, and one of the overlapped sheets includes an information identification portion, the device for counting the number of medicines comprising:

an illumination part which is configured to irradiate the near infrared rays toward the medicine packaging envelope from below the medicine packaging envelope arranged at a predetermined height in a state where said one sheet faces downward;

first and second imaging parts which are arranged at a position where the near infrared rays which pass through the medicine packaging envelope are received and are configured to image the medicine packaging envelope from different imaging positions;

a distance acquisition unit which is configured to acquire distances from the respective imaging positions to the medicine packaging envelope, the medicines therein and the information identification portion thereon by making use of parallax when viewed from the respective imaging positions, based on gray images from the first and second imaging parts, and to set a reference height comprising a vertical height from the focal point of at least one of the first and second imaging parts to the illumination part;

an image elimination unit which is configured to eliminate an image of the information identification portion based on the distances, said image elimination of the information identification portion occurring upon a determination by the image elimination unit that the distances of the medicines from the reference height are within the distance of the information identification portion from the reference height; and a medicine counting unit which is configured to count the number of medicines based on the gray images after eliminating the image, wherein the first and second imaging parts include a visible light cut filter in respective light receiving parts thereof, and the visible light cut filters are configured to prevent a reflection light which is formed by the reflection of the visible light on the medicine packaging envelope from being incident on the first and second imaging parts.

* * * * *